United States Patent

[11] 3,627,778

[72] Inventors Ludwig Nusslein;
Ernst Albrecht Pieroh, both of Berlin, Germany
[21] Appl. No. 746,710
[22] Filed July 18, 1968
[45] Patented Dec. 14, 1971
[73] Assignee Schering AG
Berlin and Bergkamen, Germany
[32] Priority Sept. 19, 1967
[33] Germany
[31] P 16 43 039.0

[54] N- AND N'-SUBSTITUTED N-BROMOACETYL UREAS
30 Claims, No Drawings

[52] U.S. Cl..................................................... 260/309.7,
260/347.3, 260/465.4, 260/482 R, 260/553 A, 260/553 E, 424/273, 424/285, 424/304, 424/311, 424/322
[51] Int. Cl....................................................... C07d 49/34

[50] Field of Search........................................... 260/309.7,
553 E, 553 A, 482 R, 465.4, 347.3

[56] References Cited
UNITED STATES PATENTS

| | | | |
|---|---|---|---|
| 2,562,863 | 7/1951 | Hoegberg..................... | 260/553 |
| 2,801,200 | 7/1957 | Hackmann................... | 167/22 |
| 3,184,507 | 5/1965 | Scherer et al................ | 260/553 |
| 3,261,865 | 7/1966 | Speziale et al............... | 260/553 |
| 3,301,896 | 1/1967 | Hayman et al............... | 260/553 |

OTHER REFERENCES

Gut et al., Collection Czechoslov. Chem. Communs. 24, 3,154– 3,162 (1958) [ original unavailable, therefore C.A. 54:4,611 has been supplied].

Primary Examiner—Henry R. Jiles
Assistant Examiner—G. Thomas Todd
Attorney—Joseph F. Padlon ABSTRACT: The specification discloses a group of N- and N'-substituted N-bromoacetyl ureas which have been found useful in the treatment of soil and seed, because they have a broad biocidal activity.

N- AND N'-SUBSTITUTED N-BROMOACETYL UREAS

The invention relates to bromoacetyl ureas having biocidal action. More particularly, the invention relates to bromoacetyl ureas for the treatment of soil and seeds.

Heretofore, urea derivatives have become known predominantly only with herbicidal action. A broad biocidal action has not been observed in such compounds until now.

The compounds covered by the invention have a fungicidal, fungistatic, nematocidal and herbicidal action, and therefore are suitable chiefly as soil and seed treatment agents.

In the stated general formula above, the radicals R may have, the following meaning: $R_1$ represents hydrogen or an alkyl group, such as methyl or ethyl, etc.; $R_2$ represents hydrogen, aralkyl, such as benzyl, etc., cycloalkyl with preferably three to eight ring members, such as cyclopropyl, cyclopentyl, cyclohexyl, cyclooctyl, etc., or possibly saturated or unsaturated alkyl mono- or multisubstituted by halogen, such as chlorine or bromine, etc., and/or alkoxy, such as methoxy or ethoxy, etc., and/or cyanogen and/or alkylmercapto, such as methylmercapto, and/or carbalkoxy, such as carbethoxy and/or a heterocyclic radical, such as alphafuryl, etc., which alkyl may be straight-chained or branched and preferably contains up to six carbon atoms, such as methyl, ethyl, to hexyl, isopropyl, secondary butyl, tertiary butyl, allyl, among others; $R_3$ represents hydrogen, bromoacetyl or the trihalogenmethylmercapto methylmercapto radical, such as the trichloromethylmercapto radical, among others; and $R_1$ and $R_2$ represents together with the $\equiv N-CO-N\equiv$ groups, at least a five-membered heterocyclic ring, such as that of N,N'-ethylene urea.

These compounds display in particular an excellent fungicidal and fungistatic action and can therefore be used for instance in agriculture or horticulture, particularly for general soil treatment. Besides the control of soil-growing fungi, plant-parasitic nematodes and seed weeks, e.g., *Senecio vulgaris*, *Chenopodium album*, *Stellaria media*, are also affected. The compounds are more or less suitable also as disinfectants for seed treatment to parasitic fungi on the seed.

With respect to their fungicidal and fungistatic efficacy, the active substances are even superior, surprisingly, to the best known compounds of equal direction of action, as the comparative experiments cited below will show.

The active substances may be used alone or as mixtures of several active substances. If desired, other fungicides, nematocides, herbicides, disinfectants or other pest control agents can be added, depending on the desired purpose. For example, if a herbicidal use is intended, fertilizers may also be used in the mixtures. Advantageously, the active substances are used in the form of preparations, such as powders, dusts, granulates, solutions, emulsions or suspensions, with addition of liquid and/or solid vehicles or diluents, and possibly with wetting, adhesion, emulsification and/or dispersion aids.

Suitable liquid vehicles that may be used in conjunction with the active compounds are water, mineral oils or other organic solvents, such as xylol, chlorobenzene, cyclohexanol, cyclohexanone, dioxane, acetonitrile, acetic ester, dimethyl formamide and dimethyl sulfoxide, among others.

As solid vehicles that are suitable are lime, kaolin, chalk, talcum, attaclay and other clays as well as natural or synthetic silica.

Among surface-active substances that may be named are salts of lignin sulfonic acid, salts of alkylated benzenesulfonic acids, sulfonated acid amides and their salts, polyethoxylated amines and alcohols.

If the active substances are to be used for seed disinfection, dyes such as New Fuchsine among others, may be admixed, to give the disinfected seed material a clearly visible color.

The production of the various forms of preparation is carried out in the usual manner such as by grinding or mixing processes.

It is to be noted that the active substances have not heretofore been described in the literature with possibly one exception, namely bromoacetyl urea, per se. The production of these compounds is affected for example by the following methods, such as:

a. where compounds of the general formula

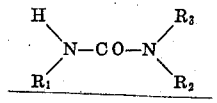

wherein $R_1$, $R_2$ and $R_3$ having the above-mentioned meaning, are reacted with compounds of the general formula $$BrCH_2-CO-R_4$$

wherein $R_4$ is halogen or the group $BrCH_2-COO-$ or, if in the above general formula $R_3$ represents hydrogen; or b. where compounds of the general formula $$O=C=N-R_2$$

with bromoacetamide of the formula $$BrCH_2-CO-NH_2$$

where the reactions are carried out preferably in the presence of inert organic solvents and, if necessary, with the addition of acid-binding substances at temperatures in the range of about 15° to about 150° C.

The reaction partners are charged in approximately equimolecular quantity.

Inert organic solvents, chlorinated organic hydrocarbons, ethers, nitriles and amides have proved satisfactory, such as chlorobenzene, dioxane, acetonitrile, acetic ester and dimethyl formamide may be used in the reactions.

The reaction occurs at temperatures in the range from about 15° to about 150° C. To accelerate the reaction and to bind the hydrogen halide forming when bromoacetyl halides are used, there may be added tertiary amines, such as triethylamine or pyridine. The reaction mixture may be processed by distilling the solvent and recrystallizing the residue in a suitable solvent. Another method is to precipitate the reaction product with water and to recrystallize it after separation by filtration.

The resulting bromoacetyl ureas are free from byproducts and the yields are good.

The following examples illustrate the production of the active compounds.

1. N-n-butyl-N'bromoacetyl urea

Fifty-eight g. of n-butyl urea are dissolved in 200 ml. of dimethyl formamide and 40 ml. of pyridine. Then, while cooling with water, 101 g. of bromoacetyl bromide are added in drops with continued stirring for 30 minutes, after which iced water is added to form the precipitate. The suction-filtered reaction product is recrystallized from 300 ml. of acetonitrile. Yield: 57 g.=48 percent of the theory.

2. N,N'-bisbromoacetyl-ethylene urea 21.5 g. of ethylene urea are dissolved in 100 ml. of dimethyl formamide at 100° C. To this are added 120 g. of bromoacetyl bromide, and the resultant mixture is cooled so that the temperature does not rise above 120° C. After a half-hour reaction, the conversion product is precipitated in iced water, suction-filtered, and recrystallized from ethanol. Yield: 52 g.=63 percent of the theory.

In the following table, additional active substances to be used according to the invention are listed.

| No. | Name of compound | Physical constant, °C. |
|---|---|---|
| 1 | N-bromoacetyl-N'-methyl urea | [1] 189 |
| 2 | N-bromoacetyl-N'-ethyl urea | 144 |
| 3 | N-bromoacetyl-N'-propyl urea | 134 |
| 4 | N-bromoacetyl-N'-isopropyl urea | 84 |
| 5 | N-bromoacetyl-N'-cyclopropyl urea | 126 |

| | | |
|---|---|---|
| 6 | N-bromoacetyl-N'-allyl urea | 139 |
| 7 | N-bromoacetyl-N'-isobutyl urea | 140 |
| 8 | N-bromoacetyl-N'-tertiary butyl urea | 110 |
| 9 | N-bromoacetyl-N'-n-amyl urea | 128 |
| 10 | N-bromoacetyl-N'-n-hexyl urea | 123 |
| 11 | N-bromoacetyl-N'-benzyl urea | 172 |
| 12 | N-bromoacetyl-N'-furfuryl urea | 168 |
| 13 | N-bromoacetyl-N,N'-ethylene urea | 173 |
| 14 | N-bromoacetyl-N'-trichloromethylmercapto-N,N'-ethylene urea | 118 |
| 15 | N-bromoacetyl-N'-beta-chloroethyl urea | 141 |
| 16 | N-bromoacetyl-N'-beta-bromoethyl urea | 136 |
| 17 | N-bromoacetyl-N'-beta-methoxyethyl urea | 136 |
| 18 | N-bromoacetyl-N'-beta-phenylethyl urea | 138 |
| 19 | N-bromoacetyl-N'-gamma-methoxypropyl urea | 100 |
| 20 | N-bromoacetyl-N'-cyanomethyl urea | 146 |
| 21 | N-bromoacetyl-N'-gamma-n-butoxypropyl urea | 76 |
| 22 | N-bromoacetyl-N'-isopropoxypropyl urea | 60 |
| 23 | N-bromoacetyl-N'-beta-methylmercaptoethyl urea | [1] 137 |
| 24 | N-bromoacetyl-N'-gamma-chloropropyl urea | 111 |
| 25 | N-bromoacetyl-N'-4-chlorobutyl urea | 126 |
| 26 | N-bromoacetyl-N'-4-methylmercaptobutyl urea | [1] 97 |
| 27 | N-bromoacetyl-N'-carbethoxymethyl urea | 164 |

[1] With decomp.

The stated melting points in the above column are not corrected.

The compounds listed above are crystalline substances having a characteristic melting point. They are soluble in chlorinated organic hydrocarbons, ethers, nitriles and amides, such as chlorobenzene, dioxane, acetonitrile, acetic ester, and dimethylformamide.

The following examples will explain the biocidal action of the compounds.

EXAMPLE 1

Steamed compost soil was inoculated with mycelium of Pythium ultimum. After homogeneous mixing of the products with the infected soil, the products were present as 20 percent of the powder preparations, there followed without a waiting period, per concentration, the sowing of 25 grains of marrow peas of the variety "Miracle of Kelvedon" in clay dishes holding 1 liter of soil.

In the following table are stated the number of germinated healthy peas and the root rating (1–4) after a cultivation period of 26 days at 22° to 25° C. As known comparative products, there were used MANEB (manganese(II)-/N,N'-ethylene-bis(dithiocarbamate)/ and CAPTAN (N-(trichloromethylthio)-cyclohex-4-ene-1,2-dicarboximide).

EXAMPLE 2

Steamed compost soil was inoculated with a spore suspension of Fusarium oxysporum, F. callistephi. After homogeneous mixing of the products with the infected soil, the products were present as 20 percent of the powder preparations, there followed after a waiting period of 5 days the planting of three seedlings of the host plant Callistephus chinensis, Master Aster "Sunray," per concentration. In the table, there is given the number of affected plants after a cultivation period of 3 weeks. As known comparative products, there was used CAPTAN (N-(trichloromethylthio)-cyclohex-4-ene-1,2-carboximide).

| Products | Concentration, mg. active subst. per liter soil | Attack after 3 weeks |
|---|---|---|
| N-bromoacetyl-N'-ethyl urea | 200 | 0 |
| | 300 | 0 |
| | 400 | 0 |
| N-bromoacetyl urea | 200 | 0 |
| | 300 | 0 |
| | 400 | 0 |
| N-bromoacetyl-N'-allyl urea | 200 | 0 |
| | 300 | 0 |
| | 400 | 0 |
| N-bromoacetyl-N,N'-ethylene urea | 200 | 3 |
| | 300 | 0 |
| | 400 | 0 |

| Product used | Concentration, mg. active subst. per lt. soil | Number of healthy peas after 26 days | Root rating (1–4) |
|---|---|---|---|
| N-bromoacetyl-N'-ethyl urea | 50 | 22 | 4 |
| | 100 | 21 | 4 |
| N-bromoacetyl urea | 50 | 20 | 4 |
| | 100 | 20 | 4 |
| N-bromoacetyl-N'-allyl urea | 50 | 20 | 4 |
| | 100 | 23 | 4 |
| N-bromoacetyl-N,N'-ethylene urea | 50 | 18 | 4 |
| | 100 | 24 | 4 |
| N-bromoacetyl-N'-n-propyl urea | 50 | 18 | 4 |
| | 100 | 22 | 4 |
| N-bromoacetyl-N'-beta-methoxyethyl urea | 50 | 23 | 4 |
| | 100 | 22 | 4 |
| N-bromoacetyl-N'-beta-chloroethyl urea | 50 | 21 | 4 |
| | 100 | 22 | 4 |
| N-N'-bis-bromoacetyl-ethylene urea | 50 | 21 | 4 |
| | 100 | 20 | 4 |
| N-bromoacetyl-N'-cyclo-propyl urea | 50 | 19 | 4 |
| | 100 | 20 | 4 |
| N-bromoacetyl-N'-isobutyl urea | 50 | 2 | 1 |
| | 100 | 21 | 3 |
| MANEB | 50 | 5 | 1 |
| | 100 | 5 | 1 |
| CAPTAN | 50 | 7 | 1 |
| | 100 | 2 | 1 |
| Steamed soil (3 control tests): | | | |
| A | | 21 | 4 |
| B | | 18 | 4 |
| C | | 21 | 4 |
| Untreated soil (3 control tests): | | | |
| A | | 0 | |
| B | | 0 | |
| C | | 5 | 1 |

NOTE.—Root rating: 4=white roots without fungus necroses; 3=white roots, slight fungus necroses; 2=brown roots, more advanced fungus necroses; 1=advanced fungus necroses, roots rotted.

| Product | mg/L | Result |
|---|---|---|
| N-bromoacetyl-N'-benzyl urea | 200 | 3 |
| | 300 | 0 |
| | 400 | 0 |
| N-bromoacetyl-N'-hexyl urea | 200 | 0 |
| | 300 | 0 |
| | 400 | 0 |
| N-bromoacetyl-N'-isopropyl urea | 200 | 0 |
| | 300 | 0 |
| | 400 | 0 |
| N-bromoacetyl-N'-n-propyl urea | 200 | 0 |
| | | 0 |
| | | 0 |
| N-bromoacetyl-N'-beta-methoxyethyl urea | 200 | 0 |
| | 300 | 0 |
| | 400 | 0 |
| N-bromoacetyl-N'-beta-chloroethyl urea | 200 | 0 |
| | 300 | 0 |
| | 400 | 0 |
| N,N'-bisbromoacetyl-ethylene urea | 200 | 3 |
| | 300 | 0 |
| | 400 | 0 |
| N-bromoacetyl-N'-cyclopropyl urea | 200 | 0 |
| | 300 | 0 |
| | 400 | 0 |
| N-bromoacetyl-N'-furfuryl urea | 200 | 0 |
| | 300 | 0 |
| | 400 | 0 |
| CAPTAN | 200 | 3 |
| | 300 | 3 |
| | 400 | 3 |
| teamed soil: | | |
| A | | 0 |
| B | | 0 |
| C | | 0 |
| Untreated soil: | | |
| A | | 3 |
| B | | 3 |
| C | | 3 |

EXAMPLE 3

Limit concentrations of fungicidal action at homogeneous mixing of the products with the infected soil are given below. Assumption in the evaluation are sound root formation and a germination of the seed of at least 90 percent as against the achieved result in the steamed soil. Per concentration, there occurred the sowing of 25 grains of peas of the variety "Miracle of Kelvedon" (Marrow pea) without waiting period. The cultivation period in the experiments was 21–26 days at a temperature of 22°–25° C. As comparative products, there were used MANEB (Manganese (II)-/N,N'-ethylene-bis(dithiocarbamate)/ and CAPTAN (N-(trichloromethylthio)- cyclohex-4-ene-1,2-dicarboximide).

(a) Pythium ultimum: Steamed compost soil was inoculated with mycelium of Pythium ultimum.
(b) So-called damping-off For this experiment, normal compost soil was used.
(c) Rhizoctonia solani: Steamed compost soil was inoculated with mycelium of Rhizoctonia solani.

EXAMPLE 4

Of the products listed, N-bromoacetyl-N'-furfuryl urea shows a very high plant tolerance. Tomatoes sprayed dripping wet with a concentration of 0.5 percent substance, for example, showed no plant damage.

As disinfectant, approximately 1 g. of active substance per kg. of peas is sufficient for a good result, as the following experiment shows.

Peas disinfected with a 50 percent formulation were sown in normal compost soil, 25 grains of peas of the variety "Miracle of Kelvedon" (marrow pea) per concentration. After a cultivation time of 14 days of 22°–25° C., the number of germinated healthy peas was determined. As comparative products, there were used CAPTAN (N-(trichloro-methyl-thio)- cyclohex-4-ene-1,2-dicarboximide), MANEB (manganese (II)-/N,N'-ethylene-bis(dithiocarbamate)/ and TMTD (Tetramethyl-thiuram-disulfide).

| Product | Number of healthy peas, active substance per kg. | | |
|---|---|---|---|
| | 0.5 g. | 1.0 g. | 2.0 g. |
| N-bromoacetyl-N'-furfuryl urea | 20 | 20 | 23 |
| CAPTAN | 8 | 12 | 23 |
| MANEB | 0 | 4 | 12 |
| TMTD | 0 | 3 | 1 |
| Steamed soil, seed without disinfection (2 control tests): | | | |
| A | 23 | | |
| B | 24 | | |
| Untreated soil, seed without disinfection (2 control tests): | | | |
| A | 1 | | |
| B | 0 | | |

EXAMPLE 5

If the following products are admixed at a rate of 200–300 mg. of active substance per liter of soil to a soil highly infected by root gell nematodes (meloidogyns) and cucumbers are sowed out after a waiting period of 8 days, the cucumber seedlings remain without visible root gall attack after a cultivation period of 4 weeks at 22°–25° C.

N-bromoacetyl urea
N-bromoacetyl-N'-methyl urea
N-bromoacetyl-N'-ethyl urea
N-bromoacetyl-N'-cyclopropyl urea
N-bromoacetyl-N'-n-amyl urea
N,N'-bisbromoacetyl-ethylene urea
N-bromoacetyl-N'-beta-chloroethyl urea LIMIT CONCENTRATIONS OF FUNGICIDAL EFFECT
[Mg. of active substance per liter of soil]

| Product | Pythium ultimum | Damping-off fungi | Rhizoctonia solani |
|---|---|---|---|
| N-bromoacetyl urea | 25–50 | 50 | 100–200 |
| N-bromoacetyl-N'-methyl urea | 50 | 50–100 | 200–300 |
| N-bromoacetyl-N'-ethyl urea | 25 | 50 | 100–200 |
| N-bromoacetyl-N'-n-propyl urea | 25 | 50 | 100–200 |
| N-bromoacetyl-N'-isopropyl urea | | 50–100 | 100 |
| N-bromoacetyl-N'-cyclopropyl urea | 25 | 25–50 | 200–300 |
| N-bromoacetyl-N'-allyl urea | 50 | 50–100 | 200–300 |
| N-bromoacetyl-N'-n-butyl urea | | | 100 |
| N-bromoacetyl-N'-isobutyl urea | 100 | 100–200 | 200–300 |
| N-bromoacetyl-N'-tert.butyl urea | 100 | 100 | 100 |
| N-bromoacetyl-N'-hexyl urea | | 300 | 300 |
| N-bromoacetyl-N'-n-amyl urea | | 200–300 | 300 |
| N-bromoacetyl-N'-benzyl urea | | 200 | |
| N-bromoacetyl-N'-furfuryl urea | 50–100 | 100 | 200 |
| N-bromoacetyl-N-N'-ethylene urea | 50 | 50–100 | |
| N,N'-bisbromoacetylethylene urea | 50 | 50–100 | 300 |
| N-bromoacetyl-N'-betachloroethyl urea | 50 | 50 | 200–300 |
| N-bromoacetyl-N'-betamethyoxyethyl urea | 50 | 50 | 200–300 |
| N-bromoacetyl-N'-betabromethyl urea | | 100–200 | 300 |
| N-bromoacetyl-N'-betaphenylethyl urea | | | 300 |
| N-bromoacetyl-N'-methoxypropyl urea | 25 | | 300 |
| N-bromoacetyl-N'-cyanomethyl urea | 50 | | 100–200 |
| N-bromoacetyl-N'-gamma-n-butoxy-propyl urea | | | 100–200 |
| N-bromoacetyl-N'-isopropoxy-propyl urea | 50–100 | | 100 |
| N-bromoacetyl-N'-beta-methyl-mercaptoethyl urea | 50–100 | | 200 |
| N-bromoacetyl-N'-gamma-chloro-propyl urea | 25 | | 50–100 |
| N-bromoacetyl-N'-4-chlorobutyl urea | 50 | | 200 |
| MANEB | 200–300 | 200–300 | >400 |
| CAPTAN | 300–400 | 300–400 | >400 |

EXAMPLE 6

Field Experiment

A soil highly infected by *Fusarium oxysporum F. callistephi* was treated with the products at the stated rates by hoeing to a depth of 10-15 cm. After a waiting period of two weeks, there occurred, per concentration, the planting of 20 ester seedlings of the delicate Master Aster "Sunray." The table gives the plant loss after a cultivation period of 5 weeks, in percent. At the same time, the herbicidal action was determined by counting the germinated weeds.

| Products | Concentration, g. active subst. per sq. in. | Plant loss after 5 wks., in percent | Herbicidal action, in percent |
|---|---|---|---|
| N-bromoacetyl-N'-ethyl urea | 20 | 75 | 70 |
|  | 40 | 0 | 82 |
|  | 60 | 0 | 86 |
|  | 80 | 0 | 92 |
| N-bromoacetyl-N'-n-propyl urea | 20 | 55 | 77 |
|  | 40 | 20 | 84 |
|  | 60 | 0 | 94 |
|  | 80 | 0 | 98 |
| Untreated | 0 | 100 | 0 |

What is claimed is:

1. A compound having the structure

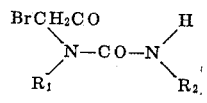

wherein $R_1$ when taken alone is hydrogen; $R_2$ when taken alone is selected from the group consisting of alkylphenyl wherein the alkyl group contains from one to two carbons, furfuryl, cyclopropyl, alkyl of from one to six carbons, alkenyl of three to six carbons, alkoxyalkyl wherein the alkyl group contains from two to 10 carbons and alkoxy contains from one to four carbons, chloro- and bromoalkyl of from one to six carbons, cyanoalkyl of from one to six carbons, methylmercaptoalkyl of from one to three carbons, trichloromethylenemercapto, and carbethoxymethyl; and when taken together $R_1$ and $R_2$ is ethylene.

2. The compound as set forth in claim 1 comprising N-bromacetyl-N'-methyl urea.

3. The compound as set forth in claim 1 comprising N-bromoacetyl-N'-ethyl urea.

4. The compound as set forth in claim 1 comprising N-bromoacetyl-N'-propyl urea.

5. The compound as set forth in claim 1 comprising N-bromoacetyl-N'-isopropyl urea.

6. The compound as set forth in claim 1 comprising N-bromoacetyl-N'-butyl urea.

7. The compound as set forth in claim 1 comprising N-bromoacetyl-N'-cyclopropyl urea.

8. The compound as set forth in claim 1 comprising N-bromoacetyl-N'-allyl urea.

9. The compound as set forth in claim 1 comprising N-bromoacetyl-N'-isobutyl urea.

10. The compound as set forth in claim 1 comprising N-bromoacetyl-N'-tertiary butyl urea.

11. The compound as set forth in claim 1 comprising N-bromoacetyl-N'-n-amyl urea.

12. The compound as set forth in claim 1 comprising N-bromoacetyl-N'-n-hexyl urea.

13. The compound as set forth in claim 1 comprising N-bromoacetyl-N'-benzyl urea.

14. The compound as set forth in claim 1 comprising N-bromoacetyl-N'-furfuryl urea.

15. The compound as set forth in claim 1 comprising N-bromoacetyl-N,N'-ethylene urea.

16. The compound as set forth in claim 1 comprising N-bromoacetyl-N'-trichloromethylmercapto-N,N'-ethylene urea.

17. The compound as set forth in claim 1 comprising N-bromoacetyl-N'-beta-chloroethyl urea.

18. The compound as set forth in claim 1 comprising N-bromoacetyl-N'-beta-bromoethyl urea.

19. The compound as set forth in claim 1 comprising N-bromoacetyl-N'-beta-methoxyethyl urea.

20. The compound as set forth in claim 1 comprising N,N'-bis-bromoacetyl-ethylene urea.

21. The compound as set forth in claim 1 comprising N-bromoacetyl-N'-beta-phenylethyl urea.

22. The compound as set forth in claim 1 comprising N-bromoacetyl-N'-gamma-methoxypropyl urea.

23. The compound as set forth in claim 1 comprising N-bromoacetyl-N'-cyanomethyl urea.

24. The compound as set forth in claim 1 comprising N-bromoacetyl-N'-gamma-n-butoxypropyl urea.

25. The compound as set forth in claim 1 comprising N-bromoacetyl-n'-isopropoxypropyl urea.

26. The compound as set forth in claim 1 comprising N-bromoacetyl-N'-beta-methylmercaptoethyl urea.

27. The compound as set forth in claim 1 comprising N-bromoacetyl-N'-gamma-chloropropyl urea.

28. The compound as set forth in claim 1 comprising N-bromoacetyl-N'-4-chlorobutyl urea.

29. The compound as set forth in claim 1 comprising N-bromoacetyl-N'-4-methylmercaptobutyl urea.

30. The compound as set forth in claim 1 comprising N-bromoacetyl-N'-carbethoxymethyl urea.

* * * * *